United States Patent
Carteri et al.

(10) Patent No.: US 11,562,096 B2
(45) Date of Patent: Jan. 24, 2023

(54) AUTOMATED DISCOVERY AND MANAGEMENT OF PERSONAL DATA

(71) Applicant: International Business Machines Corporation, Armonk, NY (US)

(72) Inventors: Francesco Maria Carteri, Rome (IT); Antonio Perrone, Rome (IT); Leonardo Rosati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 16/361,517

(22) Filed: Mar. 22, 2019

(65) Prior Publication Data

US 2020/0302082 A1 Sep. 24, 2020

(51) Int. Cl.
  G06F 21/62 (2013.01)
  G06F 16/901 (2019.01)
  G06F 16/908 (2019.01)

(52) U.S. Cl.
  CPC ........ G06F 21/6245 (2013.01); G06F 16/901 (2019.01); G06F 16/908 (2019.01)

(58) Field of Classification Search
  CPC ... G06F 21/6245; G06F 16/901; G06F 16/908
  See application file for complete search history.

(56) References Cited

U.S. PATENT DOCUMENTS

| | | | |
|---|---|---|---|
| 7,024,409 B2 | 4/2006 | Iyengar | |
| 2009/0172644 A1* | 7/2009 | Nagarajan | G06F 8/33 717/128 |
| 2014/0136576 A1* | 5/2014 | Cherel | G06F 21/6227 707/813 |
| 2017/0123671 A1* | 5/2017 | Kundu | G06F 3/0623 |
| 2017/0139674 A1* | 5/2017 | Arasan | G06F 16/2457 |
| 2017/0206599 A1* | 7/2017 | Garcia | G06Q 40/025 |
| 2017/0243028 A1 | 8/2017 | LaFever et al. | |
| 2018/0063182 A1 | 3/2018 | Jones et al. | |
| 2018/0276401 A1* | 9/2018 | Allen | G06F 21/6245 |

OTHER PUBLICATIONS

Wang et al., "A Utility-aware Visual Approach for Anonymizing Multi-attribute Tabular Data", IEEE, Aug. 29, 2017, DOI: 10.1109/TVCG.2017.2745139, 10 pages, http://www.cad.zju.edu.cn/home/vagblog/VAG_Work/2017privacy.pdf.

* cited by examiner

*Primary Examiner* — Carl G Colin
*Assistant Examiner* — Hany S. Gadalla
(74) *Attorney, Agent, or Firm* — Scott Dobson

(57) ABSTRACT

Embodiments of the present disclosure describe selective discovery, management, and deletion of personal data. The method accesses a set of data on a networked resource. The data is formed of a plurality of data elements which are arranged in at least one data table. The method identifies one or more sensitive data elements within the set of data related to one or more individuals. The method determines a sensitivity level of the one or more sensitive data elements and generates a catalogue including at least one new data element representative of the one or more sensitive data elements and based on the sensitivity level of the one or more sensitive data elements. The method tags the one or more sensitive data elements within the catalogue based on the sensitivity level of the one or more sensitive data elements corresponding to the new data element.

17 Claims, 5 Drawing Sheets

AUTOMATED DISCOVERY AND MANAGEMENT OF PERSONAL DATA

BACKGROUND

Computer systems and communications networks enable distribution or sharing of data across varied network resources. Often, sensitive or personal data is shared, transmitted, or stored on these network resources. Such personal or sensitive information is often intertwined with non-sensitive or non-personally identifiable information. The intertwined nature of these data sets makes selective identification and deletion of sensitive or personal data difficult. Conditions may occur in which a user or client may desire deletion of personal, sensitive, or identifying information. Applications are not ready to handle this sort of removal scenario from network resources and storage systems of runtime data or backup data. Further, it is difficult to identify all instances of sensitive or personal information that has been propagated across a broad range of applications, network resources, and other data storage devices. Legislation also places additional pressure on technical difficulties. For example the General Data Protection Regulation mandates removal of certain user information from varying computer systems once a suitable request has been made.

SUMMARY

According to an embodiment described herein, a computer-implemented method for selective discovery, management, and deletion of personal data is provided. The personal data may be managed by accessing a set of data on a network resource. The set of data is formed from a plurality of data elements. The data elements are arranged in at least one data table. The method identifies one or more sensitive data elements within the set of data. The one or more sensitive data elements include sensitive information related to one or more individuals. The method may determine a sensitivity level of the one or more sensitive data elements. The method may generate a catalogue including at least one new data element representative of the one or more sensitive data elements and based on the sensitivity level of the one or more sensitive data elements. The method may then tag the one or more sensitive data elements within the catalogue based on the sensitivity level of the one or more sensitive data elements corresponding to the new data element.

In some embodiments the sensitive data element of the one or more sensitive data elements has a first sensitivity level and represents a specified column of a data table. A sensitive data element of the one or more sensitive data elements may also have a second sensitivity level and represent a specified cell within a column of the data table.

In some embodiments, the data table of the method is an input table. In such embodiments, the method generates an output data table from the input data table. The output data table includes a subset of data elements of the plurality of data elements. The subset of data elements may include at least one sensitive data element. Based on generating the output data table, the method may propagate a tag for the at least one sensitive data element.

In some embodiments, propagating the tag for at least one sensitive data element may include tagging the at least one sensitive data element within a catalogue based on a sensitivity level of the at least one sensitive data element. The tagging may also be based on inclusion of the at least one sensitive data element within the output data table.

In some embodiments, tagging at least one sensitive data element includes tagging one or more cells of a column within a catalogue based on a sensitivity level of at least one sensitive data element. The catalogue may be associated with an output data table and a tagged one or more cells representing at least one cell within the output data table. In some embodiments, tagging the at least one sensitive data element within the catalogue includes tagging a column of the catalogue based on the sensitivity level of the at least one sensitive data element. The catalogue may be associated with the output data table and the tagged column may represent a column within the output data table.

In some embodiments, a plurality of data elements is distributed across a plurality of data tables. The method may include identifying a tag for a requested data element within a catalogue. The method may identify the tag based on a deletion request. The tag may indicate the requested data element is included in one or more sensitive data elements of the plurality of data elements. The method may identify the requested data element stored in one or more data tables of the plurality of data tables. The method may identify the requested data element based on identifying the tag for the requested data element. The method may then delete the requested data element from the one or more data tables.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
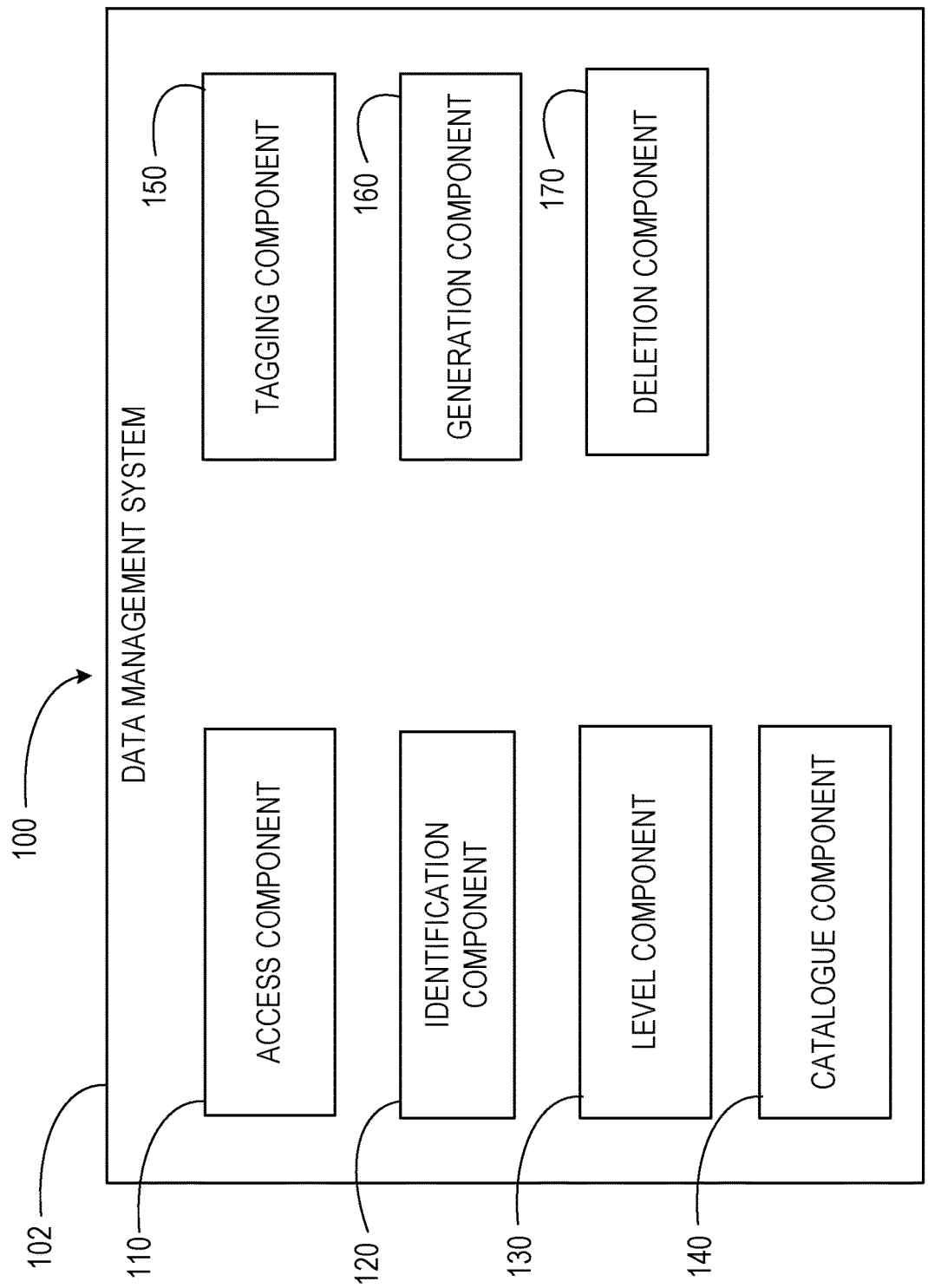
FIG. 1 depicts a block diagram of a computing environment for implementing concepts and computer-based methods, according to at least one embodiment.

The present disclosure relates generally to a method for managing data flow, and more specifically, but not exclusively, to a computer-implemented method for selective discovery, management, and deletion of personal data. The present disclosure relates further to a related system for segmenting and searching video content, and a computer program product.

Media files, such as video content, are widely shared between users via multiple communications methods and made available for access across networks (e.g., the internet). Users often also share personal, sensitive, or identifying information with media sharing platforms. Some organizations (e.g., hospitals, governmental entities, professional associations, etc.) collect and use sensitive, personal, or identifying information of clients, employees, patients, and other individuals. Digital clients use varying services and private data is spread across a large number of systems and applications. When a user seeks to revoke permissions to sensitive, private, or identifying data, the user may desire that the related data be deleted for varying applications and resources.

Applications are generally not capable of responding to such selective deletion requests. Further storage systems and other network resources are similarly ill-equipped to remove runtime and backup data in such a selective manner. There are technical difficulties with identifying the personally identifying or sensitive information selected for deletion. Further technical difficulties exist in identifying all instances of such data across varied applications and data resources. Current technology and data manipulation techniques are missing a way to associate all data ingested for a specific user or transformed during the data processing of a system which could still refer to the same user. Similarly, current technologies and data management techniques are missing a method to remove from backup databases, files, or logs portions of tables, data sets, or file sets referring only to a specific user.

Embodiments of the present disclosure provide a technical solution for selective discovery, management, and deletion of personal data. As will be discussed in more detail below, embodiments of the present disclosure allow identification of data introduced into a system for a specific user or client. Such methods and systems, described herein, technically enable execution of the "right to be deleted." In some instances, methods and systems of the present disclosure decorate or otherwise generate identifying characteristics of data across varied systems and applications. The present disclosure enables deletion of sensitive or personally identifying information which has been tagged for a specific user. The present disclosure enables recognition of specific portions of data independently of a storage system (e.g., databases, file systems, services, applications, etc.). Further, the present disclosure enables identification and deletion of sensitive information independent of transformations performed on such data, where the data still contains the personal or identifying information. Some embodiments of the present disclosure describe a method to delete portions of data from storage resources using a virtualized environment with a specified artifact for a specific data type and context.

In some embodiments, each time a user requests deletion of all data related to the user, embodiments of the present disclosure may leverage tagged data elements or tagged catalogues to search, identify and delete data from a given system or set of networked resources. Methods and systems of the present disclosure may reduce runtime of virtualized or containerized environments containing sensitive, personal, or identifying data elements and restored data. Reduction of runtime and tagging of data elements and structures within catalogues may enable full deletion of sensitive, personal, or identifying information on data storages, backups, runtime data, and any other information or data repositories or structures. Virtualized or containerized environments may be realized by instantiating artifacts generated by an artifacts manager. Methods and systems of the present disclosure may track all storages tables, files, and logs of artifacts related to a specific user during data ingestion and transformation phases. The methods and systems of the present disclosure, tracking the sensitive data elements, may produce artifacts related to the specific user and leverage creation and usage of the artifacts to enable or execute a received deletion request for data introduced, modified, or transformed. In some embodiments, a virtualized environment employs a reduced or theoretically minimized runtime to restore data or execute a deletion request. In some instances, artifacts generated within the present disclosure contain references to storages of data, whether ingested or transformed, and pointers to cloud services, applications, and scripts to be used to perform the deletion for a specified user's identification. In some instances, in deleting data based on a deletion request, the systems and methods of the present disclosure identify or collect all of the artifacts prepared within a group of network resources and instantiates a minimum runtime reported.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a data management system 102. The data management system 102 may comprise an access component 110, an identification component 120, a level component 130, a catalogue component 140, a tagging component 150, a generation component 160, and a deletion component 170. The access component 110 may access data sets on network resources. The identification component 120 may identify sensitive data elements from the set of data. The level component 130 may determine sensitivity levels of the sensitive data. The catalogue component 140 may generate catalogues including data elements representative of sensitive data. The tagging component 150 may tag sensitive data elements within the catalogues which may be propagated and persistent across transformations of the set of data. The generation component 160 generates output data tables associated with catalogues. The deletion component 170 deletes data identified and selected by one or more of the other components of the data management system 102.

Figure 2:
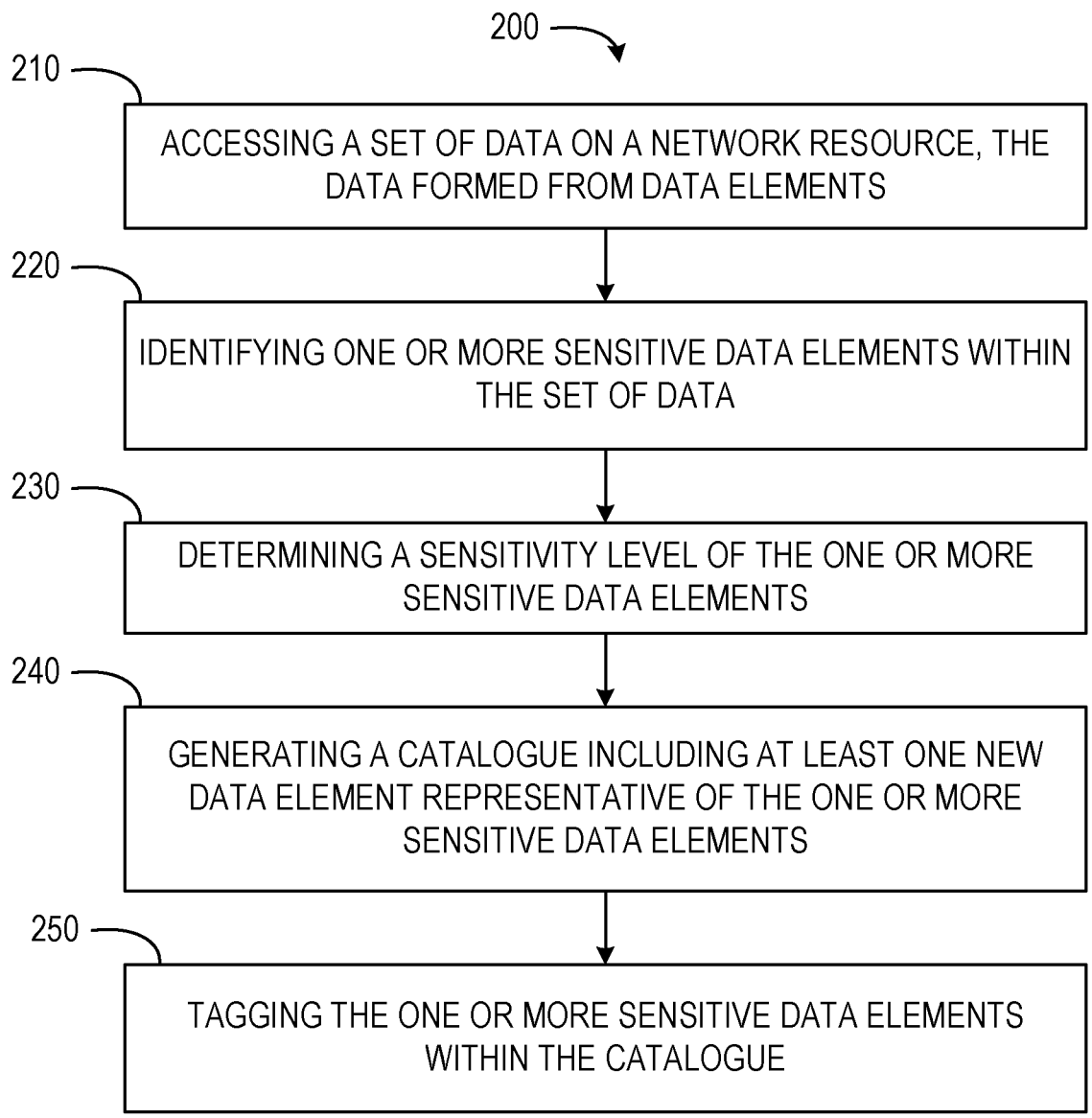
FIG. 2 depicts a block diagram of a computer-implemented method for selective discovery, management, and deletion of personal data, according to at least one embodiment.

Referring now to FIG. 2, a block diagram of a computer-implemented method 200 is shown. The computer-implemented method 200 is a method for selective discovery, management, and deletion of personal data. In some embodiments, the computer-implemented method 200 may be performed by one or more components of the computing environment 100, as described in more detail below.

At operation 210, the access component 110 accesses a set of data on a network resource. In some embodiments, the data is formed from a plurality of data elements. The plurality of data elements may by arranged in at least one data table. Data may be ingested into a system by passing data elements into data tables that can contain sensitive and non-sensitive data. As will be discussed in more detail below, tagging or decoration of data may be performed such that transformation, translation, or other passage of data may be similarly tagged by columns, rows, or individual cells to aid in deletion of sensitive data elements. In some embodiments, the plurality of data elements is distributed across a plurality of data tables. In some embodiments, the access component 110 accesses the set of data on a database, a networked resource, a server, or any other suitable repository of data. Access of the set of data may be triggered ingestion of new data by the suitable repository. The access component 110 may also access the set of data periodically (e.g., access responsive to time, storage considerations, etc.), or any other suitable trigger event. In some instances, the access component 110 may access the set of data directly, via receipt of the data.

In some embodiments, during ingestion, an artifacts manager generates a set of artifacts. The set of artifacts may include a name and version, a list of services, names of data structures, and tags. The list of microservices may be a list of microservices for a minimum or theoretically minimum runtime used for deletion of personal, sensitive, or identifying data. For example, the list of microservices may include names of applications, scripts, services used to enable starting a restoration operation for specific data for each specific storage type used to ingest the data. The names of data structures may include names of files, tables, and any storage objects involved in data ingestion. The tags, described in more detail below, may be used to decorate ingested or transformed data specific to a user. As such, in some embodiments, tags and catalogues, discussed in more detail below, may be a part of an artifact manager or artifact manager functionality.

At operation 220, the identification component 120 identifies one or more sensitive data elements within the set of data. In some embodiments, the one or more sensitive data elements include sensitive information relating to one or more individuals. Sensitive data may include identifying information (e.g., personal designation or identification numbers, governmental identification numbers, names), identifying patient information, protected patient information (e.g., identifying health information), financial information (e.g., account numbers), account names, combinations thereof, and any other personal, sensitive, or identifying information. The identification component 120 may identify the one or more sensitive data elements based on a data type, a category, a data entry method, a data entry context, or any other suitable method. For example, the identification component 120 may identify sensitive data elements entered into specified fields of an electronic form or application. The identification component 120 may identify sensitive data elements entered into a patient database or from a patient record. Although described with respect to specific examples, it should be understood that the identification component 120 may identify the one or more sensitive data elements in a variety of different ways without departing from the scope of the present disclosure.

At operation 230, the level component 130 determines a sensitivity level of the one or more sensitive data elements. The sensitivity level may describe a sensitivity context of a sensitive data element. For example, sensitivity levels may indicate sensitivity based on an instance of sensitive data, a category or class of sensitive data, a grouping of sensitive data, combinations thereof, or any other suitable sensitivity context. In some embodiments, a sensitive data element of the one or more sensitive data elements has a first sensitivity level. The first sensitivity level may represent a sensitive column within a data table. As such, the sensitive data element with the first sensitivity level may represent a specified column of the data table. For example, a sensitive column may be a column designated for financial data such as account numbers or identification numbers, patient identification data, or any other categorically sensitive information. In some embodiments, a sensitive data element of the one or more sensitive data elements has a second sensitivity level. The second sensitivity level may represent a sensitive cell within a column of a data table. As such, the sensitive data element with the second sensitivity level may represent a specified cell within a column of the data table. For example, a sensitive cell may be a cell including an instance of sensitive or identifying information. Where a specified cell contains sensitive or identifying information, the column in which the cell is located may not be categorically sensitive or may contain cells with no sensitive or identifying information.

At operation 240, the catalogue component 140 generates a catalogue including at least one new data element representative of the one or more sensitive data elements. In some embodiments, the catalogue is generated based, at least in part, on the sensitivity level of the one or more sensitive data elements. The catalogue component 140 may build the catalogue in stages. For example, the catalogue component 140 may initially build the catalogue to include sensitive columns (e.g., sensitive attributes, categories, or classes). These columns may represent one or more columns of the at least one data table. The one or more columns of the at least one data table may be columns configured to or classified to include personal, sensitive, or identifying information of users or clients of a specified computing system or network resource. The catalogue component 140 may then guild the catalogue to include cells representative of instances of sensitive data elements. The sensitive data elements may be included in come columns of data in the at least one data table. For example, a column of the at least one data table may not include sensitive data elements in each of the cells, but may include sensitive data elements in specified rows or cells. As such, the catalogue component 140 may generate the catalogue to include a representation of sensitive columns (e.g., columns designated for sensitive data elements or including sensitive data elements in each cell) and a representation of sensitive cells. Although described as a staged process, it should be understood that the catalogue component 140 may also build the catalogue simultaneously or contemporaneously, incorporating representations of columns or cells as they are encountered as the components of the data management system 102 encounters the columns or cells within the at least one data table.

At operation 250, the tagging component 150 tags the one or more sensitive data elements within the catalogue. A tag may refer to all personal, sensitive, or identifying data associated with a specified identification, user, client, patient, or other individual. The tag may refer to values in columns or cells, as well as file attachments, files, data structures, or data elements. The tagging may be based on the sensitivity level of the one or more sensitive data elements corresponding to the new data element. The tagging component 150 may generate tags of varying type, based on the sensitivity level of data elements or columns in the at least one data table. In some embodiments, a first flag (i.e., type one) and a second flag (i.e., type two) are used. The type one flag may be understood as a full flag denoting a sensitive column, as described above in operation 240. The type two flag may be understood as a half flag denoting sensitive cells, as described above in operation 240. The tagging component 150 may apply the type one flag and type two flags to appropriate entries within the catalogue, such that the flags are linked or associated with columns or cells of the at least one data table. Further, the flags may be associated with the sensitive data elements. Where all or portions of the data elements of the at least one data table are propagated, by transformation or copying, flags associated with columns, cells, or individual sensitive data elements may be propagated automatically.

Figure 3:
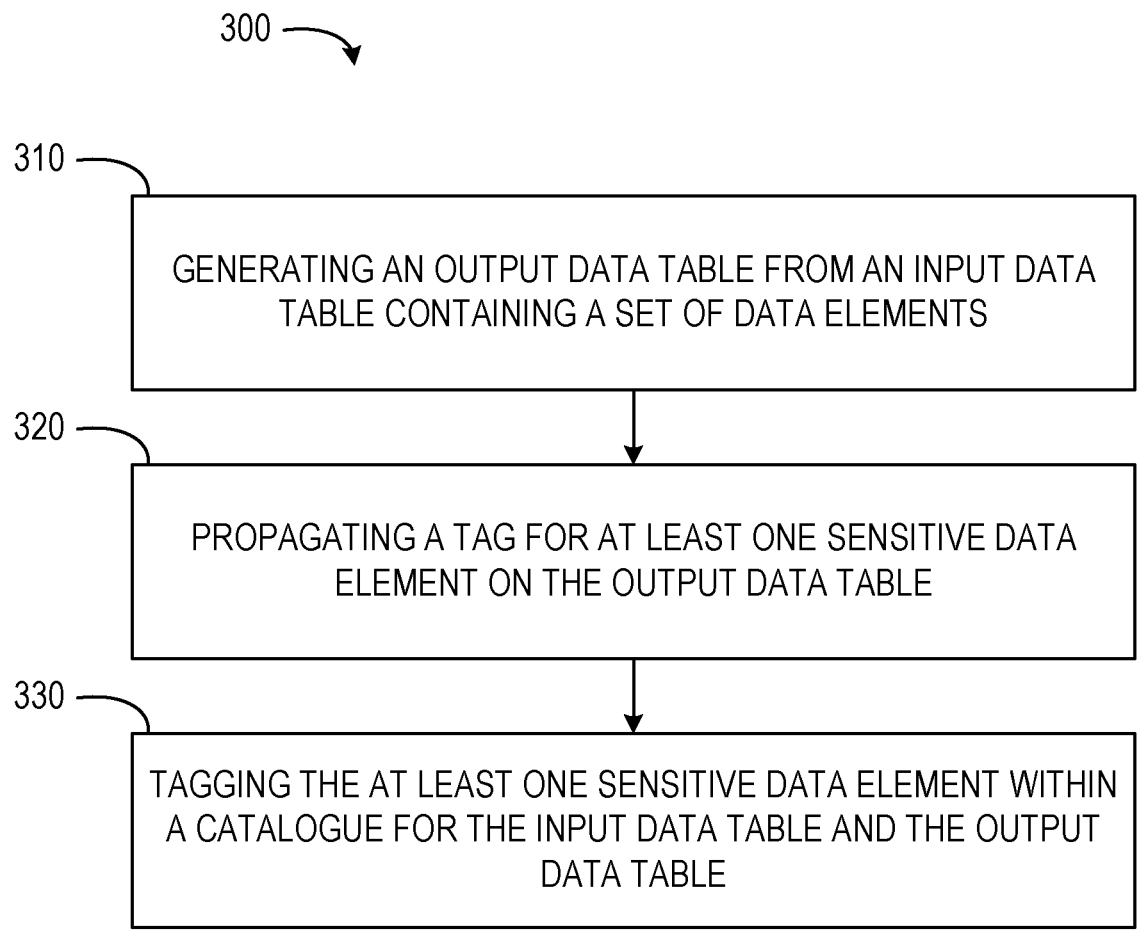
FIG. 3 depicts a block diagram of a computer-implemented method for selective discovery, management, and deletion of personal data, according to at least one embodiment.

FIG. 3 shows a block diagram of an embodiment of a computer-implemented method 300 for selective discovery, management, and deletion of personal data. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the generation component 160 generates an output data table from the input data table. The output data table may be generated by copying, transferring, transforming, or otherwise performing data processing operations on at least a portion of the input data table. The output data table may include a subset of data elements of the plurality of data elements. In some embodiments, the subset of data elements includes at least one sensitive data element. The output data table may also contain data elements transformed or otherwise transferred from one or more other data table or which are newly created.

In operation 320, the catalogue component 140 propagates a tag for the at least one sensitive data element. In some embodiments, the catalogue component 140 propagates the tag based on the generation component 160 generating the output data table. To catalogue component 140 may automatically propagate the tag for the at least one sensitive data element by transferring the data elements into the output table. The catalogue component 140 may propagate the tag by comparing the data elements and columns included in the output table with the catalogue generated in operations of the method 200. In some instances, the tag may transfer, be applied, or otherwise be associated with the sensitive data element included in the input table and the output table, and represented within the catalogue.

In some instances, when an input data table and an output data table are linked with a relationship of keys or tags, the propagation of the tag may be done by flagging a column on a destination that is linked to the input data table, which has already been flagged or tagged. For example, where a fiscal code column of an input data table has been tagged or flagged as a sensitive column, catalogue metadata may indicate the column or the data within the column are sensitive. Transforming data elements from the column, or the entirety of the column, from the input data table to the output data table may propagate the tag statistically without running and without additional data.

In some instances, when an input data table contains a specific row, within a column, with a value that contains a sensitive value or sensitive data element (e.g., an email address), the sensitive value or sensitive data element (e.g., the cell within the column) may be tagged. When the output data table is generated with a column having data elements with a type two flag (e.g., sensitive cells), the column or the individual cells may be tagged. Propagation in this manner may similarly be performed from one output data table to another subsequent output data table.

In operation 330, the catalogue component 140 tags the at least one sensitive data element within a catalogue. The catalogue component 140 may tag the at least one sensitive data element based on a sensitivity level of the at least one sensitive data element and inclusion of the at least one sensitive data element within the output table. In some embodiments, the catalogue component 140 tags the at least one sensitive data element within a catalogue in an update procedure. The catalogue may be updated, or a new catalogue generated, with new columns or data elements generated for or included in the output data table. In some embodiments, the catalogues are updated or new catalogues are created along with creation of a new output data table. The catalogue may be updated, or a catalogue may be newly generated, with tags associated with differing sensitivity levels of the sensitive data elements or columns. For example, where the catalogue or input data table has type one and type two flags, the catalogue may be updated, or new catalogue generated, with the type one and type two flags carried over from the initially created catalogue.

As referenced above, in some embodiments, to tag the at least one sensitive data element, the catalogue component 140 tags one or more cells of a column within the catalogue based on the sensitivity level of the at least one sensitive data element. The catalogue may be associated with the output data table. The tagged one or more cells may represent at least one cell within the output data table. In some embodiments, to tag the at least one sensitive data element, the catalogue component 140 tags a column of the catalogue based on the sensitivity level of the at least one sensitive data element. The catalogue may be associated with the output data table. The tagged column may represent a column within the output data table.

Figure 4:
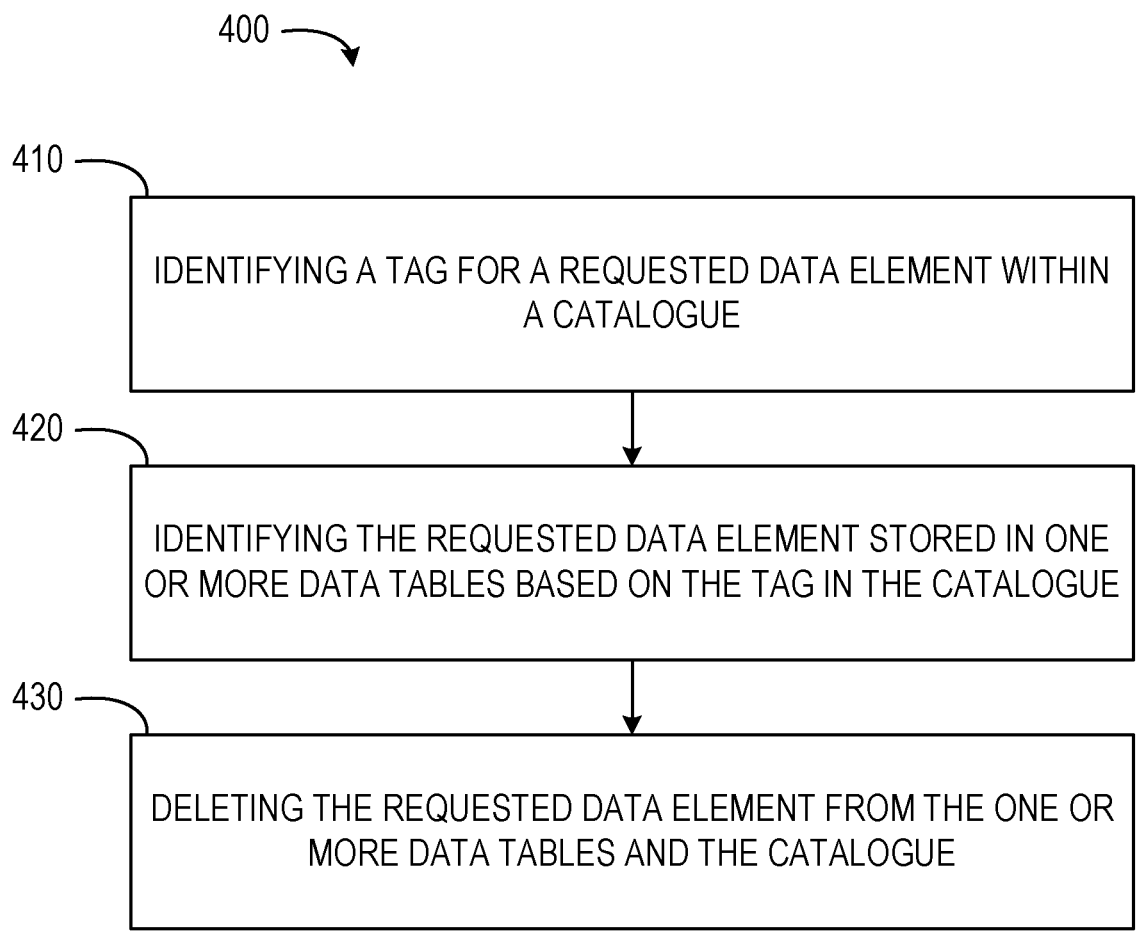
FIG. 4 depicts a block diagram of a computer-implemented method for selective discovery, management, and deletion of personal data, according to at least one embodiment.

FIG. 4 shows a block diagram of an embodiment of a computer-implemented method 400 for selective discovery, management, and deletion of personal data. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the identification component 120 identifies a tag for a requested data element within a catalogue. The tag may indicate the requested data element is included in the one or more sensitive data elements of the plurality of data elements, as discussed above with respect to methods 200 and 300. In some embodiments, the identification component 120 identifies the tag based on a deletion request. The deletion request may indicate a user desires to delete personal, sensitive, or identifying information from the network resource. The deletion request may be received as a result of selection of user interface elements by a client or user of the network resource (e.g., a user requesting deletion of their own data). The deletion request may be received from an administrator, acting as an intermediary for a deletion request from a user. Although described with respect to specific circumstances, it should be understood that the deletion request may be received by the identification component 120 in any suitable manner and from any suitable source.

In operation 420, the identification component 120 identifies the requested data element stored in one or more data tables of a plurality of data tables across which the plurality of data elements is distributed. The identification component 120 may identify the requested data element based on identifying the tag for the requested data element. For example, once a tag associated with the requested data element is identified, the identification component 120 may parse data elements, data tables, or other data structures available on the network resource to identify data elements associated with the tag.

In operation 430, the deletion component 170 deletes the requested data element from the one or more data tables.

Once the identification component 120 has identified data elements of the network resource associated with one or more tags of the catalogue, the identification component 120 may pass those data elements, addresses of the data elements, or any other information identifying the data elements. The deletion component 170 may then delete, mark for deletion, overwrite, purge, or otherwise make unavailable the requested data element (e.g., the sensitive data element associated with the deletion request). In some embodiments, the identification component 120 also identifies an address, identification, or other information identifying a location of the sensitive data element, or representation thereof, within the catalogue. The identification component 120 may pass the information identifying the requested data element within the catalogue to the deletion component 170. The deletion component 170 may then delete the requested data element, or the representation thereof, from the catalogue.

In some embodiments, deletion of multiple data elements referring to multiple users or identified in multiple deletion requests may be scheduled with a single operation. In such embodiments, the single operation may reduce or minimize a process expense and a time to provision of a virtualized environment for deletion of the data. In these instances, ingested data can be referred to a specific user at ingestion time and along all data transformation phases and the system may be ready to accept, at any time, a user deletion request through execution with a light system and set of operations that cleanup varied kinds of storage, database tables, files, logs, and other data structures.

Figure 5:
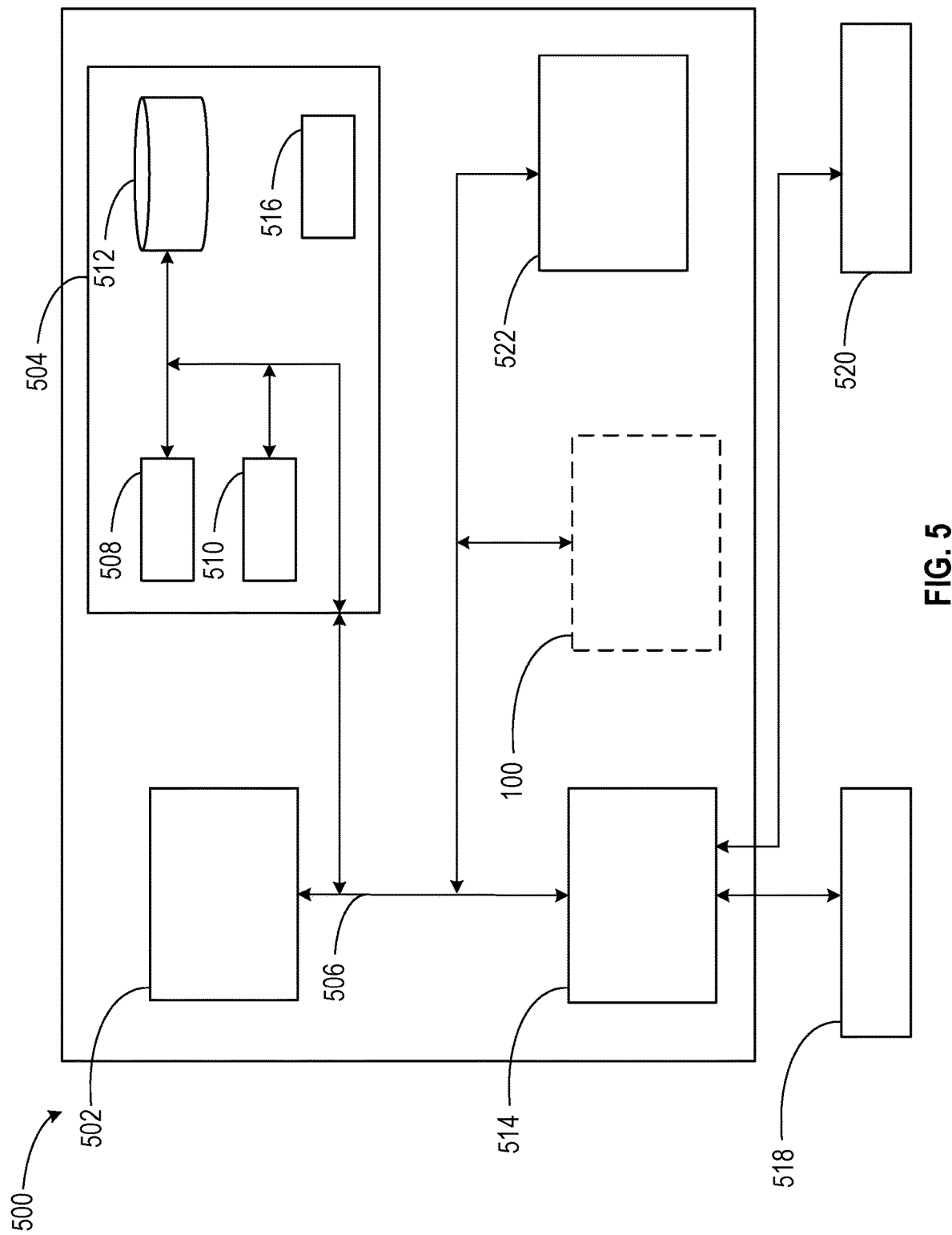
FIG. 5 depicts a block diagram of a computing system for selective discovery, management, and deletion of personal data, according to at least one embodiment.

Embodiments of the present disclosure may be implemented together with virtually any type of computer, regardless of the platform being suitable for storing and/or executing program code. FIG. 5 shows, as an example, a computing system 500 suitable for executing program code related to the methods disclosed herein.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the access component 110, the identification component 120, the level component 130, the catalogue component 140, the tagging component 150, the generation component 160, and the deletion component 170. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514.

Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method, comprising:
    accessing, by a data management system including at least one processor and a memory, a set of data on a network resource, the data formed from a plurality of data elements, the plurality of data elements arranged in at least one data table, the at least one data table being an input data table;
    identifying, by the data management system, one or more sensitive data elements within the set of data, the one or more sensitive data elements including sensitive information related to one or more individuals;
    determining, by the data management system, a sensitivity level of the one or more sensitive data elements;
    generating, by the data management system, a first catalogue and a second catalogue, the first catalogue including a first new data element representative of a column of a data table associated with at least one sensitive data element of the one or more sensitive data elements and generated based on the sensitivity level of the one or more sensitive data elements, the second catalogue including a second new data element representative of an instance of the at least one sensitive data element of the one or more sensitive data elements and generated based on the sensitivity level of the one or more sensitive data elements;
    tagging, by the data management system, the at least one sensitive data element within the first catalogue with a first flag based on the sensitivity level of the one or more sensitive data elements corresponding to the first new data element and tagging the instance of the at least one sensitive data element within the second catalogue with a second flag based on the sensitivity level of the one or more sensitive data elements, the first flag denoting a sensitive column within a data table and the second flag denoting a sensitive cell within a data table;
    generating an output data table from the input data table, the output data table including a subset of data elements of the plurality of data elements, the subset of data elements including at least one sensitive data element; and
    based on generating the output data table, within the output data table, propagating the first flag for one or more columns associated with the at least one sensitive data element and propagating the second flag for instances associated with the at least one sensitive data element.

2. The method of claim 1, wherein a sensitive data element of the one or more sensitive data elements has a first sensitivity level and represents a specified column of the at least one data table.

3. The method of claim 1, wherein a sensitive data element of the one or more sensitive data elements has a second sensitivity level and represents a specified cell within a column of the at least one data table.

4. The method of claim 1, wherein propagating the tag for the at least one sensitive data element further comprises:
    tagging the at least one sensitive data element within the first catalogue based on a sensitivity level of the at least one sensitive data element and inclusion of the at least one sensitive data element within the output data table.

5. The method of claim 4, wherein tagging the at least one sensitive data element further comprises:
    tagging one or more cells of a column within the second catalogue based on the sensitivity level of the at least one sensitive data element, the second catalogue associated with the output data table and the tagged one or more cells representing at least one cell within the output data table.

6. The method of claim 4, wherein tagging the at least one sensitive data element within the first catalogue further comprises:
    tagging a column of the first catalogue based on the sensitivity level of the at least one sensitive data element, the first catalogue associated with the output data table and the tagged column representing a column within the output data table.

7. The method of claim 1, wherein the plurality of data elements are distributed across a plurality of data tables, the method further comprising:
- based on a deletion request, identifying a tag for a requested data element within the first catalogue, the tag indicating the requested data element is included in the one or more sensitive data elements of the plurality of data elements;
- based on identifying the tag for the requested data element, identifying the requested data element stored in one or more data tables of the plurality of data tables; and
- deleting the requested data element from the one or more data tables.

8. A system, comprising:
one or more processors; and
a computer-readable storage medium, coupled to the one or more processors, storing program instructions that, when executed by the one or more processors, cause the one or more processors to perform operations comprising:
- accessing, by a data management system including at least one processor and a memory, a set of data on a network resource, the data formed from a plurality of data elements, the plurality of data elements arranged in at least one data table, the at least one data table being an input data table;
- identifying, by the data management system, one or more sensitive data elements within the set of data, the one or more sensitive data elements including sensitive information related to one or more individuals;
- determining, by the data management system, a sensitivity level of the one or more sensitive data elements;
- generating, by the data management system, a first catalogue and a second catalogue, the first catalogue including a first new data element representative of a column of a data table associated with at least one sensitive data element of the one or more sensitive data elements and generated based on the sensitivity level of the one or more sensitive data elements, the second catalogue including a second new data element representative of an instance of the at least one sensitive data element of the one or more sensitive data elements and generated based on the sensitivity level of the one or more sensitive data elements;
- tagging, by the data management system, the at least one sensitive data element within the first catalogue with a first flag based on the sensitivity level of the one or more sensitive data elements corresponding to the first new data element and tagging the instance of the at least one sensitive data element within the second catalogue with a second flag based on the sensitivity level of the one or more sensitive data elements, the first flag denoting a sensitive column within a data table and the second flag denoting a sensitive cell within a data table;
- generating an output data table from the input data table, the output data table including a subset of data elements of the plurality of data elements, the subset of data elements including at least one sensitive data element; and
- based on generating the output data table, within the output data table, propagating the first flag for one or more columns associated with the at least one sensitive data element and propagating the second flag for instances associated with the at least one sensitive data element.

9. The system of claim 8, wherein propagating the tag for the at least one sensitive data element further comprises:
- tagging the at least one sensitive data element within the first catalogue based on a sensitivity level of the at least one sensitive data element and inclusion of the at least one sensitive data element within the output data table.

10. The system of claim 9, wherein tagging the at least one sensitive data element further comprises:
- tagging one or more cells of a column within the second catalogue based on the sensitivity level of the at least one sensitive data element, the second catalogue associated with the output data table and the tagged one or more cells representing at least one cell within the output data table.

11. The system of claim 9, wherein tagging the at least one sensitive data element within the first catalogue further comprises:
- tagging a column of the first catalogue based on the sensitivity level of the at least one sensitive data element, the first catalogue associated with the output data table and the tagged column representing a column within the output data table.

12. The system of claim 8, wherein the plurality of data elements are distributed across a plurality of data tables, the operations further comprising:
- based on a deletion request, identifying a tag for a requested data element within the first catalogue, the tag indicating the requested data element is included in the one or more sensitive data elements of the plurality of data elements;
- based on identifying the tag for the requested data element, identifying the requested data element stored in one or more data tables of the plurality of data tables; and
- deleting the requested data element from the one or more data tables.

13. A computer program product comprising a computer readable storage medium having program instructions embodied therewith, the program instructions being executable by one or more processors to cause the one or more processors to perform operations comprising:
- accessing, by a data management system including at least one processor and a memory, a set of data on a network resource, the data formed from a plurality of data elements, the plurality of data elements arranged in at least one data table, the at least one data table being an input data table;
- identifying, by the data management system, one or more sensitive data elements within the set of data, the one or more sensitive data elements including sensitive information related to one or more individuals;
- determining, by the data management system, a sensitivity level of the one or more sensitive data elements;
- generating, by the data management system, a first catalogue and a second catalogue, the first catalogue including a first new data element representative of a column of a data table associated with at least one sensitive data element of the one or more sensitive data elements and generated based on the sensitivity level of the one or more sensitive data elements, the second catalogue including a second new data element representative of an instance of the at least one sensitive data element of the one or more sensitive data elements and generated based on the sensitivity level of the one or more sensitive data elements;

tagging, by the data management system, the at least one sensitive data element within the first catalogue with a first flag based on the sensitivity level of the one or more sensitive data elements corresponding to the first new data element and tagging the instance of the at least one sensitive data element within the second catalogue with a second flag based on the sensitivity level of the one or more sensitive data elements, the first flag denoting a sensitive column within a data table and the second flag denoting a sensitive cell within a data table;

generating an output data table from the input data table, the output data table including a subset of data elements of the plurality of data elements, the subset of data elements including at least one sensitive data element; and based on generating the output data table, propagating, within the output data table, the first flag for one or more columns associated with the at least one sensitive data element and propagating the second flag for instances associated with the at least one sensitive data element.

14. The computer program product of claim 13, wherein propagating the tag for the at least one sensitive data element further comprises:

tagging the at least one sensitive data element within the first catalogue based on a sensitivity level of the at least one sensitive data element and inclusion of the at least one sensitive data element within the output data table.

15. The computer program product of claim 14, wherein tagging the at least one sensitive data element further comprises:

tagging one or more cells of a column within the second catalogue based on the sensitivity level of the at least one sensitive data element, the second catalogue associated with the output data table and the tagged one or more cells representing at least one cell within the output data table.

16. The computer program product of claim 14, wherein tagging the at least one sensitive data element within the first catalogue further comprises:

tagging a column of the first catalogue based on the sensitivity level of the at least one sensitive data element, the first catalogue associated with the output data table and the tagged column representing a column within the output data table.

17. The computer program product of claim 13, wherein the plurality of data elements are distributed across a plurality of data tables, the operations further comprising:

based on a deletion request, identifying a tag for a requested data element within the first catalogue, the tag indicating the requested data element is included in the one or more sensitive data elements of the plurality of data elements;

based on identifying the tag for the requested data element, identifying the requested data element stored in one or more data tables of the plurality of data tables; and deleting the requested data element from the one or more data tables.

* * * * *